United States Patent [19]
Bailey et al.

[11] Patent Number: 5,168,416
[45] Date of Patent: Dec. 1, 1992

[54] AUTOMATIC FLASHOVER PROTECTION FOR LOCOMOTIVE TRACTION MOTORS

[75] Inventors: Ronald B. Bailey; Herbert J. Brown, both of Erie; Myron L. Smith, Fairview; Edgar T. Balch, Erie; Roger D. Huczko, Erie; Joseph A. Laukaitis, Erie, all of Pa.

[73] Assignee: General Electric Company, Erie, Pa.

[21] Appl. No.: 584,566

[22] Filed: Sep. 18, 1990

[51] Int. Cl.$^5$ .............................................. H02H 7/08
[52] U.S. Cl. ........................................ 361/31; 361/42; 361/23; 322/69; 322/27
[58] Field of Search ................ 361/20, 23, 28, 31, 361/33, 2, 5, 10, 11, 111, 42; 322/18, 17, 27, 39, 59, 69, 70; 363/54

[56] References Cited

U.S. PATENT DOCUMENTS

| | | | |
|---|---|---|---|
| 4,112,475 | 9/1978 | Stitt et al. | 361/33 |
| 4,475,139 | 10/1984 | Chadwick | 361/111 |
| 4,608,619 | 8/1986 | Bomer et al. | 361/31 |
| 4,634,887 | 1/1987 | Balch et al. | 361/3 |

FOREIGN PATENT DOCUMENTS 1266117  2/1990  Canada ........................ 348/35

Primary Examiner—A. D. Pellinen
Assistant Examiner—C. Schultz
Attorney, Agent, or Firm—R. Thomas Payne

[57] ABSTRACT

Flashover protection is provided for a locomotive propulsion system including a plurality of d-c traction motors each having a commutator subject to flashovers, a traction alternator having armature and field windings and a rotor driven by a prime mover, a controllable source of excitation current connected to the alternator field, and means including an electric power rectifier for connecting the alternator to the motor commutators. It comprises means for producing a fault signal whenever a flashover occurs in any motor, a solid-state controllable electric valve connected between the excitation current source and the alternator field and having alternative conducting and non-conducting states, and means for changing the valve from conducting to non-conducting states in response to a fault signal being produced, whereupon the magnitude of excitation current in the alternator field is rapidly reduced toward zero and the alternator's output current is correspondingly decreased whenever a flashover occurs.

23 Claims, 6 Drawing Sheets

AUTOMATIC FLASHOVER PROTECTION FOR LOCOMOTIVE TRACTION MOTORS

BACKGROUND OF THE INVENTION

This invention relates generally to electrical propulsion systems for traction vehicles (such as diesel-electric locomotives) equipped with direct current traction motors, and it relates more particularly to improved means for protecting such a system from serious damage in the event of a flashover on the commutator of such a motor.

In a modern diesel-electric locomotive, a thermal prime mover (typically a 16-cylinder turbocharged diesel engine) is used to drive an electrical transmission comprising a synchronous generator that supplies electric current to a plurality of direct current (d-c) traction motors whose rotors are drivingly coupled through speed-reducing gearing to the respective axle-wheel sets of the locomotive. The generator typically comprises a main 3-phase traction alternator, the rotor of which is mechanically coupled to the output shaft of the engine. When excitation current is supplied to field windings on the rotating rotor, alternating voltages are generated in the 3-phase armature windings on the stator of the alternator. These voltages are rectified and applied to the armature and/or field windings of the d-c traction motors.

In normal motoring operation, the propulsion system of a diesel-electric locomotive is so controlled as to establish a balanced steady-state condition wherein the engine-driven alternator produces, for each discrete position of a throttle handle, a substantially constant, optimum amount of electrical power for the traction motors. In practice suitable means are provided for overriding normal operation of the propulsion controls and reducing engine load in response to certain abnormal conditions, such as loss of wheel adhesion or a load exceeding the power capability of the engine at whatever engine speed the throttle is commanding. This response, generally referred to as deration, reduces traction power, thereby helping the locomotive recover from such temporary conditions and/or preventing serious damage to the engine.

In addition, the propulsion control system conventionally includes means for limiting or reducing alternator output voltage as necessary to keep the magnitude of this voltage and the magnitude of load current from respectively exceeding predetermined safe maximum levels or limits. Current limit is effective when the locomotive is accelerating from rest. At low locomotive speeds, the traction motor armatures are rotating slowly, so their back EMF is low. A low alternator voltage can now produce maximum motor current which in turn produces the high tractive effort required for acceleration. On the other hand, the alternator voltage magnitude must be held constant at its maximum level whenever locomotive speed is high. At high speeds the traction motor armatures are rotating rapidly and have a high back EMF, and the alternator voltage must then be high to produce the required load current.

In an electric propulsion system, all of the power components (alternator, rectifier, traction motors, and their interconnecting contactors and cables) need to be well insulated to avoid harmful short circuits between the electrically energized parts of these components and ground. The insulation has to withstand very harsh conditions on a locomotive, including constant vibration, frequent mechanical shocks, infrequent maintenance, occasional electrical overloads, a wide range of ambient temperatures, and an atmosphere that can be very wet and/or dirty. If the insulation of a component were damaged, or if its dielectric strength deteriorates; or if moisture or an accumulation of dirt were to provide a relatively low resistance path through or on the surface of the insulation, then undesirably high leakage current can flow between the component and the locomotive frame which is at ground potential. Such an insulation breakdown can be accompanied by ionization discharges or flashovers. The discharge will start before the voltage level reaches its ultimate breakdown value. The dirtier and wetter the insulation, the lower the discharge starting voltage relative to the actual breakdown value. Without proper detection and timely protection, there is real danger that an initially harmless electrical discharge will soon grow or propagate to an extent that causes serious or irreparable damage to the insulation system and possibly to the equipment itself.

It is conventional practice to provide ground fault protection for locomotive propulsion systems. Such protective systems typically respond to the detection of ground leakage current by overriding the normal propulsion controls and reducing traction power if and when the magnitude of such current exceeds a permissible limit which depends on the magnitude of motor current. See U.S. Pat. No. 4,608,619 and Canadian patent No. 1,266,117. Such systems have not been wholly successful in preventing damaging flashovers on the commutators of the traction motors.

In d-c traction motors, carbon brushes rubbing on commutator bars are utilized to provide current to armature windings of the motor. This current establishes a magnetic field in the armature and corresponding magnetic poles. The magnetic poles created in the armature interact with magnetic poles in field windings of the motor to produce torque in the machine. The magnetic poles in the field windings of the motor are established by means of direct current flowing through these windings. The motor includes a plurality of commutator bars equally spaced around one end of the armature, each of the commutator bars being connected to selected windings of the armature for establishing the magnetic poles. As adjacent commutator bars periodically pass under the carbon brushes, the armature coils connected thereto are momentarily short circuited. Since the coils associated with the short circuited commutator bars are displaced from each other, they will be passing through magnetic flux fields created by the magnetic poles of the field windings which are of different magnitudes. Accordingly, a potential difference will exist between the two commutator bars. In the design of an ideal machine the brushes are located between field poles at a point where flux created by the field poles passes through zero in its reversal between adjacent poles of opposite magnetic polarity. This ideal point shifts with changes in armature current since the total flux is the sum of field flux and armature flux. Typically, a commutating pole or interpole is put between adjacent field poles, each commutating pole having a winding which is serially connected in the armature current path so that the flux generated by the commutating pole is proportional to armature current. This method generally serves to minimize changes in the interpole flux thus allowing the brush to transfer current between commutator bars without an undue amount of electrical arcing.

For motors that are subject to heavy overloads, rapidly changing loads, operation with weak main fields, defective brushes, brush bounce, or rough commutators, there is a possiblity that the commutating pole action may be insufficient, and a simple sparking at the brushes may become a major arc. For example, at the instant an armature coil is located at the peak of a badly distorted flux wave, the coil voltage may be high enough to break down the air between the adjacent commutator bars to which the coil is connected and result in flashover, or arcing, between these bars. Arcing between commutator segments may quickly bridge adjacent brush holders or spread to the grounded flash ring that usually surrounds the commutator of a d-c traction motor, thereby short circuiting the output lines of the traction alternator. While such flashovers are relatively rare, if one occurs it will usually happen when the locomotive is traveling at a high speed.

Many different systems are disclosed in the relevant prior art for automatically detecting and recovering from flashover conditions. See for example U.S. Pat. No. 4,112,475—Stitt and Williamson. To minimize or avoid serious damage to the traction motor and associated parts of the propulsion system when a flashover occurs, it is desirable to extinguish the flashover before the current being supplied to the faulted motor has time to attain its maximum available short-circuit magnitude. By very rapidly reducing or interrupting such current as soon as the flashover can be detected, the amount of electrical energy in the faulted motor circuit will be kept low enough to prevent permanent damage to the commutator bars, brush holders, and flash ring. This desired high speed flashover protection cannot be obtained by opening the electrical contactor that connects the faulted motor to the rectified output of the alternator, because the opening action of a conventional contactor is too slow and by the time the contactor tips start to separate the fault current magnitude could be so high as to cause undesirable arcing or welding of such tips. The deration function of the propulsion controls cannot be relied on to reduce the initial surge of current that the traction alternator supplies to the faulted motor, because the relevant time constants of the controls and of the alternator field excitation circuit introduce a finite delay between the occurrence of a flashover and the response of the alternator.

SUMMARY OF THE INVENTION

A general objective of the present invention is to provide improved flashover protection means for locomotive traction motors.

Another objective is to provide flashover protection characterized by its very fast response to the detection of a flashover condition in a d-c traction motor and by its effective suppression of such a condition before current supplied to the faulted motor can rise to its maximum available magnitude.

A more specific objective of the invention is to provide, for a locomotive propulsion system, flashover protection means that rapidly extinguishes a flashover in a d-c traction motor and that electrically disconnects the faulted motor from the traction alternator for a sufficient interval to allow the flashed commutator to heal.

Another specific objective is to provide, for a diesel-electric locomotive propulsion system, flashover protection means that is operative rapidly to extinguish flashovers in the d-c traction motors but is not operative in the event of short circuits caused by failed diodes in the electric power rectifier bridge of the propulsion system.

A further objective is the provision, in flashover protection means utilizing a high-speed, solid-state controllable electric valve, of means for coordinating the turn off and turn on operations of such valve in a manner that permits simplification of the snubber circuit shunting the valve.

The improved flashover protection means is useful in a traction vehicle propulsion system comprising a controllable source of electric power for energizing a plurality of d-c traction motors each having armature and field windings and a commutator subject to flashovers. The power source comprises a 3-phase synchronous generator having armature and field windings and a rotor driven by a prime mover on board the vehicle. The generator field windings are connected to a controllable source of unidirectional excitation current that includes means for varying the magnitude of such current as a function of the value of a variable control signal. Suitable excitation control means normally determines the value of this control signal in response to selected input signals, including a reference signal the value of which normally depends on the power setting of the vehicle throttle (or brake handle).

The 3-phase armature windings on the stator of the synchronous generator are connected to the traction motor commutators by means of an uncontrolled electric power rectifier (comprising a plurality of pairs of power diodes and associated electrical fuses) and a plurality of electrical contactors. Operating means is provided for causing each contactor to change between closed and opened positions, thereby connecting (or disconnecting) the respective motors to the rectifier as desired. A family of feedback signals respectively representative of the magnitudes of armature currents in the traction motors is derived by suitable current sensing means. A flashover on the commutator of any one of the motors causes an abnormally large increase in the armature current magnitude of that motor.

In carrying out the invention in one form, a high-speed, solid-state controllable electric valve is connected between the excitation current source and the generator field windings. This valve has alternative first and second states. In its first state the valve has negligible resistance and freely conducts excitation current, whereas in the second state it has a resistance of very high ohmic value that resembles an open circuit and effectively decouples the excitation current source from the generator field windings. The controllable valve is suitably constructed to change states very quickly, and means is provided for changing it from first to second states in response to a fault signal being produced by flashover detecting means whenever a flashover occurs in any of the traction motors. As soon as the valve changes to its second, open-circuit state, excitation current in the generator field windings rapidly decays toward zero, and the output voltage of the generator is correspondingly decreased to rapidly extinguish the flashover before the armature current in the faulted motor can rise to the maximum available short-circuit magnitude. In other words, whenever a flashover occurs the initial current surge is desirably limited by quickly disconnecting the generator field from the source of excitation current.

In one aspect of the invention, the aforesaid controllable electric valve comprises a gate turnoff thyristor poled to conduct generator field excitation current when in a turned-on state (corresponding to said first state) and effectively blocking such current when in a turned-off state (corresponding to said second state). This thyristor is shunted by electrical impedance means that preferably comprises the parallel combination of a non-linear resistor and a snubber capacitor which limits the rate of change of voltage across the GTO thyristor when changing states.

In another aspect of the invention, the aforesaid flashover detecting means comprises means responsive to the current feedback signals for producing the fault signal if the magnitude of armature current in any of said traction motors exceeds a predetermined threshold which is higher than the magnitude of motor armature current under all normal conditions.

In a different aspect of the invention, when a fault signal is produced by the flashover detecting means, the control means for the generator excitation current source temporarily imposes a control signal value corresponding to zero excitation current. At the same time, the operating means for the traction motor contactors opens each of these contactors but not before the magnitude of armature current in the associated motor is below a predetermined level to ensure that the contactors will open safely. Because the controllable electric valve in the generator excitation current path quickly decoupled the excitation source from the generator field as summarized above, the magnitude of current in the faulted motor decreases very rapidly from its initial surge to such safe level.

Preferably, the flashover protection means includes additional means operative after the contactors have been opened in response to a flashover to cause the aforesaid operating means to reclose all of the contactors except the one(s) associated with the faulted motor(s), as determined by means for identifying any traction motor in which armature current has a magnitude exceeding the aforesaid predetermined threshold. The operating means is prevented from reclosing the latter contactor(s), following the initial production of the fault signal by the flashover detecting means, for an interval sufficiently long to allow the flashed commutator to be cleaned by the brushes riding over the commutator surface.

In still another aspect of the invention, GTO gating means is provided for supplying the aforesaid gate turnoff thyristor with alternative turn-on and turnoff signals as selectively controlled by associated logic means. The logic means is arranged to perform several different functions. It includes means for providing a command signal having a first state if there is no fault signal and if certain other conditions are normal and having a second state otherwise. Whenever the command signal is in its first state, the turn-on signal is produced and has a certain minimum duration. Means including a timer produces the turnoff signal while the command signal is in its second state and no turn-on signal is being produced. The timer is arranged to prevent the command signal, after changing from first to second states, from returning to its first state for a predetermined period long enough to allow the traction motor contactors to open and reclose as summarized above. This also provides time for the capacitor in the aforesaid impedance means to discharge through the parallel resistor, thereby avoiding the need to use conventional means in series with the capacitor for limiting its discharge current when the GTO thyristor is returned to a turned on state by the next turn-on signal.

Preferably the logic means also includes means responsive to the magnitude of generator excitation current for preventing the command signal from changing from first to second states if such magnitude exceeds an abnormally high level which is higher than the maximum excitation current typically attained in response to a flashover. This will inhibit the production of a turnoff signal in the event excitation current is greater than such level, as will be the case if a diode in the power rectifier fails to block reverse current (in which event it is desirable to let the generator output current rise to a magnitude high enough to blow the fuse associated with the failed diode). Consequently, the gate turnoff thyristor need not be capable of turning off current greater than the aforesaid high level.

The invention will be better understood and its many objectives and advantages will be more fully appreciated from the following description taken in conjunction with the accompanying drawings.

DETAILED DESCRIPTION OF THE INVENTION

Figure 1:
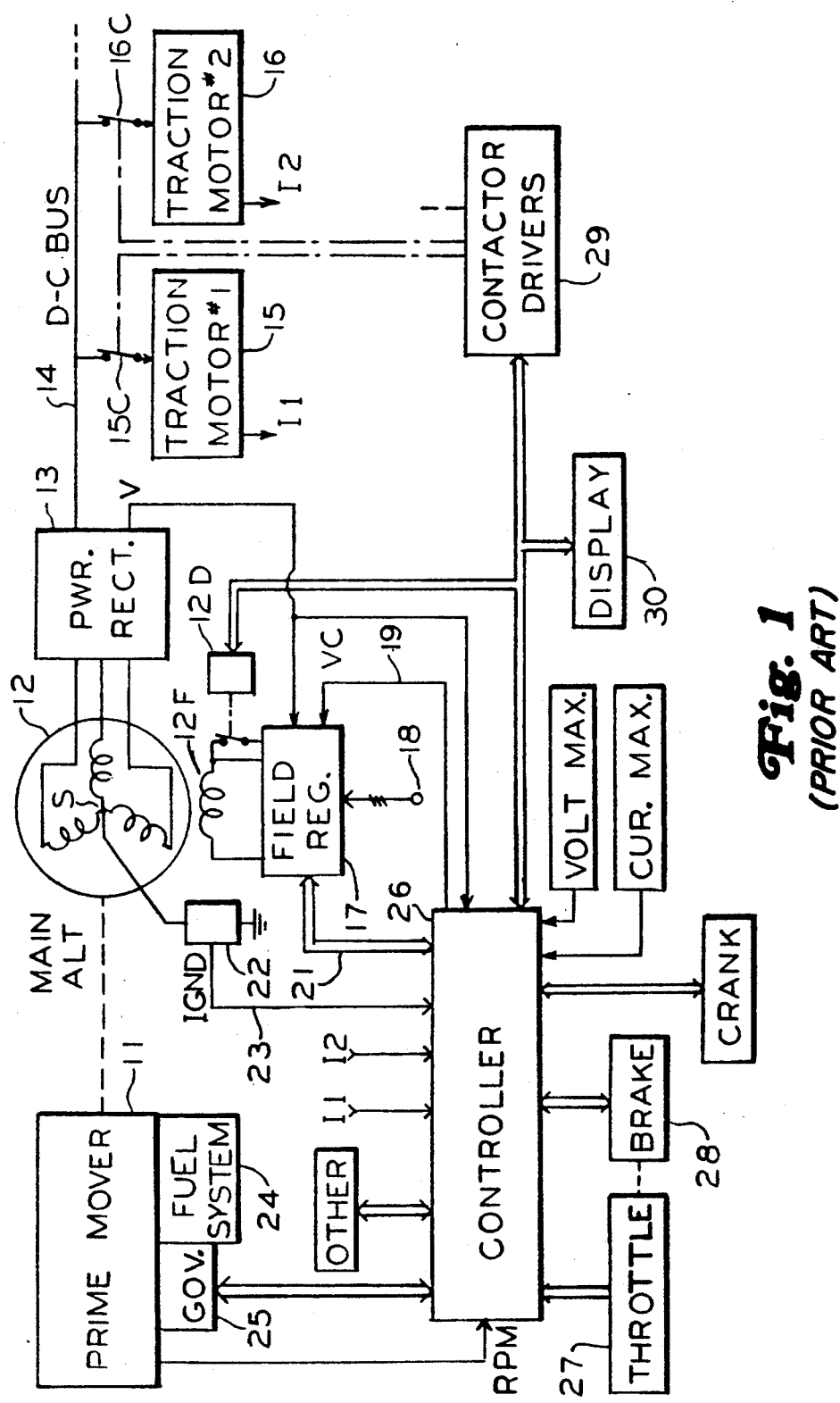
FIG. 1 is a block diagram of an electrical propulsion system for a locomotive, including a thermal prime mover (such as a diesel engine), a synchronous generator, an electric power rectifier, a plurality of traction motors, a controllable source of excitation current, and a controller.

The propulsion system shown in FIG. 1 includes a variable-speed prime mover 11 mechanically coupled to the rotor of a dynamoelectric machine 12 comprising a 3-phase alternating current (a-c) synchronous generator, also referred to as the main traction alternator. The main alternator 12 has a set of three star-connected armature windings on its stator. In operation, it generates 3-phase voltages in these windings, which voltages are applied to a-c input terminals of at least one 3-phase, double-way uncontrolled power rectifier bridge 13. In a conventional manner, the bridge 13 is formed by a plurality of pairs of power diodes, two or three such pairs being associated with each of the three different phases of the main alternator 12. The diodes in each pair are serially connected between relatively positive and negative direct current (d-c) output terminals of the rectifier bridge, and their junction is connected via a protective fuse (not shown) to the respectively associated a-c input terminal of the bridge. The output of the bridge 13 is electrically coupled, via a d-c bus 14 and a plurality of individual electrical contactors 15C, 16C, in energizing relationship to a plurality of parallel-connected, adjustable speed d-c traction motors, only two of which (15, 16) are shown in FIG. 1. Prime mover 11, alternator 12, and rectifier 13 are suitably mounted on the platform of a self-propelled traction vehicle which typically is a 4-axle or 6-axle diesel-electric locomotive. The locomotive platform is in turn supported on two trucks (not shown), each having two or more axle-wheel sets. A separate traction motor is hung on each axle, and its rotor is mechanically coupled via conventional gearing in driving relationship to the associated axle-wheel set. Suitable current sensing means are used to provide a family of current feedback signals I1, I2, etc. that are respectively representative of the magnitudes of the motor armature currents.

Figure 2A:
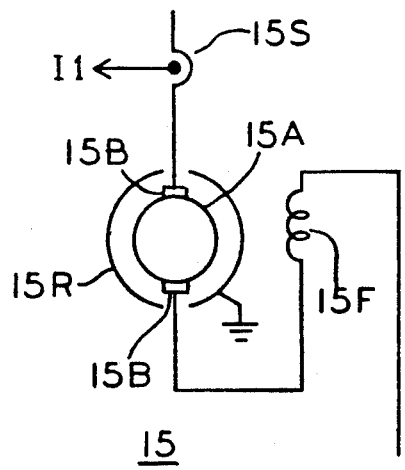
FIG. 2A is a schematic diagram of one of the d-c traction motors represented by simple blocks in FIG. 1.

The first traction motor 15 is shown in FIG. 2A and is typical of the others. On the cylindrical rotor of this motor there are a plurality of armature windings that respectively terminate at different bars or segments of a conventional commutator 15A with which non-rotating carbon brushes 15B are in sliding contact. A grounded flash ring 15R is positioned around the commutator in spaced relation thereto. The motor has field windings 15F on its stator, and during the motoring or propulsion mode of operation these windings are electrically connected in series with the armature as is shown in FIG. 2A. The direction of armature rotation, and hence the direction in which the locomotive is propelled, depends on the relative direction of field current and can be reversed by changing the contact position of a conventional bistable electromechanical reverser (not shown) connected in series with the field windings 15F. For dynamically braking or retarding the locomotive the armature windings of each traction motor are disconnected from the power rectifier 13 and reconnected to a conventional fan-blown dynamic braking resistor grid (not shown), and the field windings of all of the motors are reconnected in series with each other for energization by the rectified output of the main alternator 12. As can be seen in FIG. 2A, the current feedback signal I1 is provided by a suitable current sensor 15S connected in series with the armature windings of the traction motor 15. I1 is therefore representative of the magnitude of current in the series-connected armature and field windings of this motor when operating in a motoring mode.

The main alternator 12 and the power rectifier 13 serve as a controllable source of electric power for the respective traction motors. The magnitude of output voltage (or current) of this source is determined and varied by the amount of excitation current supplied to field windings 12F on the rotor of the main alternator. These field windings are connected for energization to the output of a suitable source 17 of regulated excitation current IF. In the illustrated embodiment of the invention, the connection between the field windings 12F and the excitation current source 17 include a contact 12C of a conventional electromechanical field switch. The field switch has control means 12D for moving it to a first or normal state, in which the contact 12C is closed and freely conducts excitation current, and for causing this switch to change between its first state and a second or alternative state, in which the contact 12C is open and excitation current is effectively interrupted. In practice the control means 12D comprises an electromagnetic coil and an associated actuating mechanism that will move the field switch to its normal state and hold it there only if this coil is energized.

Figure 2B:
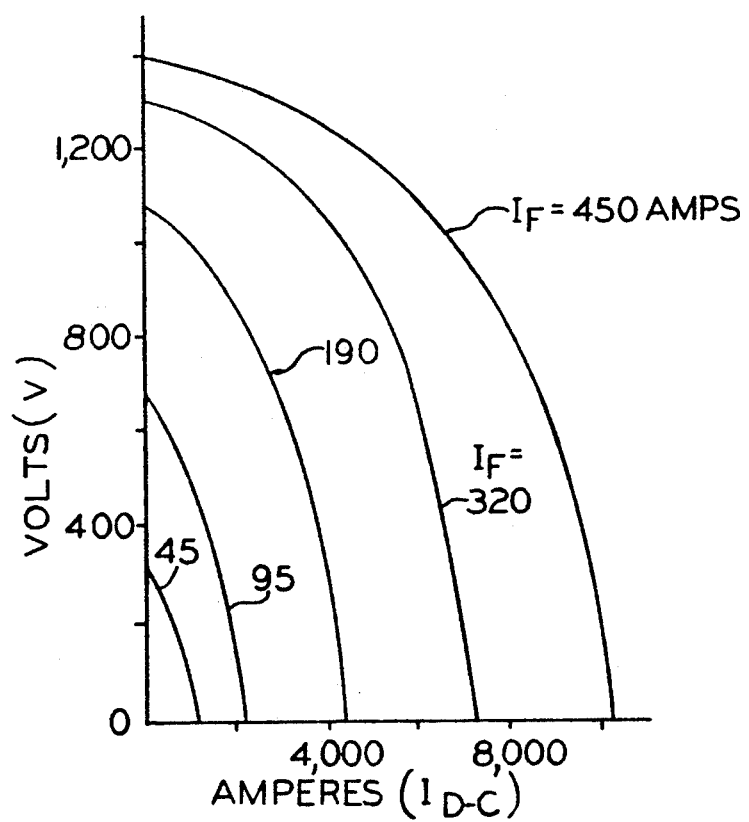
FIG. 2B is a family of load saturation curves of a typical synchronous generator, showing the relationship between output voltage and current for various magnitudes of excitation current.

Preferably the excitation current source 17 comprises a 3-phase controlled rectifier bridge the input terminals 18 of which receive alternating voltages from a prime mover-driven auxiliary alternator that can actually comprise an auxiliary set of 3-phase armature windings on the same frame as the main alternator 12. The source 17 is labeled "Field Regulator" in FIG. 1. It includes conventional means for varying the magnitude of direct current IF supplied to the alternator field 12F (and hence the output of the alternator 12) as necessary to minimize any difference between the value of a variable control signal VC on an input line 19 and a feedback signal which during motoring is representative of the average magnitude V of the rectified output voltage of the main alternator 12. The latter voltage magnitude is a known function of the magnitude of excitation current in the field windings 12F and the magnitude of output current in the armature windings of the main alternator, respectively, and it also varies with the speed of the prime mover 11. It is sensed by a conventional voltage sensing module connected across the d-c output terminals of the power rectifier. The curves in FIG. 2B illustrate exemplary relationships between V and the average magnitude of load current at the output terminals of the power rectifier 13 as supplied by a typical alternator 12 driven at constant speed (e.g., 1050 RPM) by the prime mover 11 and excited by field current IF of various different magnitudes which are labeled on the respective curves.

A current detecting module 22 of relatively low resistance (e.g., approximately ten ohms) is connected between the neutral S of the alternator armature windings and the grounded chassis or frame of the locomotive, as indicated in FIG. 1. The module 22 provides on an output line 23 a feedback signal representative of the magnitude (IGND) of ground leakage current in the electric propulsion system. It will be apparent that IGND is a measure of current flowing, via the module 22, between the neutral S and any ground fault in the armature windings of the main alternator 12, in the power rectifier 13, or in the electric load circuit that is connected to the power rectifier. The latter circuit includes the field windings of the traction motors 15, 16, etc. and, in the motoring mode of operation, the motor armature windings as well.

The prime mover 11 that drives the alternator field 12F is a thermal or internal-combustion engine or equivalent. On a diesel-electric locomotive, the motive power is typically provided by a high-horsepower, turbocharged, 16-cylinder diesel engine. Such an engine has a fuel system 24 that includes a pair of fuel pump racks for controlling how much fuel oil flows into each cylinder each time an associated fuel injector is actuated by a corresponding fuel cam on the engine camshafts. The position of each fuel rack, and hence the quantity of fuel supplied to the engine, is controlled by an output piston of an engine speed governor system 25 to which both racks are linked. The governor regulates engine speed by automatically displacing the racks, within predetermined limits, in a direction and by an amount that minimizes any difference between actual and desired speeds of the engine crankshaft. The desired speed is set by a variable speed call signal received from an associated controller 26, which signal is herein called the speed command signal or the speed call signal. An engine speed signal (RPM) indicates the actual rotational speed of the engine crankshaft and hence of the alternator field.

The speed command signal for the engine governor system 25 and the excitation control signal VC for the alternator field current source 17 are provided by the controller 26. In a normal motoring or propulsion mode of operation, the values of these signals are determined by the position of a handle of a manually operated throttle 27 to which the controller 26 is electrically coupled. A locomotive throttle conventionally has eight power positions or notches (N), plus idle and shutdown. N1 corresponds to a minimum desired engine speed (power), while N8 corresponds to maximum speed and full power. With the throttle in its idle position, the controller 26 is operative to impose on the control signal VC a value corresponding to IF=0, and no traction power is produced by the main alternator 12. When dynamic braking of a moving locomotive is desired, the operator moves the throttle handle to its idle position and manipulates an interlocking handle of a companion brake control device 28 so that the main controller 26 is now supplied with a variable "brake call" signal that will determine the value of the alternator excitation control signal VC. (In the braking mode, a feedback signal which is representative of the magnitude of the current being supplied to the traction motor field windings from the rectified output of the main alternator 12 will be supplied to the alternator excitation source 17 and there subtracted from the control signal on line 19 to determine the difference or error signal to which the source 17 responds.) In a consist of two or more locomotives, only the lead unit is usually attended, and the controller onboard each trail unit will receive, over trainlines, encoded signals that indicate the throttle position or brake call selected by the operator in the lead unit.

For each power level of the engine there is a corresponding desired load. The controller 26 is suitably arranged to translate the notch information from the throttle 27 into a reference signal value substantially equal to the value that the voltage feedback signal V will have when the traction power matches the called-for power, and so long as the alternator output voltage and load current are both within predetermined limits the control signal VC on the input line 19 of the excitation current source 17 is varied as necessary to obtain this desired load. For this purpose, and for the purpose of deration (i.e., unloading the engine) and/or limiting engine speed in the event of certain abnormal conditions, it is necessary to supply the controller 26 with information about various operating conditions and parameters of the propulsion system, including the engine.

As is illustrated in FIG. 1, the controller 26 receives the above-mentioned engine speed signal RPM, voltage feedback signal V, and current feedback signals I1, I2, etc. which are representative, respectively, of the magnitudes of current in the armature windings of the individual traction motors. It also receives a load control signal issued by the governor system 25 if the engine cannot develop the power demanded and still maintain the called-for speed. (The load control signal is effective, when issued, to reduce the power reference value in the controller 26 so as to weaken the alternator field until a new balance point is reached.) Additional data supplied to the controller 26 include: "VOLT MAX" and "CUR MAX" data that establish absolute maximum limits for the alternator output voltage and current, respectively; "CRANK" data indicating whether or not an engine starting (i.e., cranking) routine is being executed; and relevant inputs from other selected sources, as represented by the block labeled "OTHER." The alternator excitation source 17 and the controller communicate with each other via a multiline serial data link or bus 21. The controller 26 also communicates with the control means 12D that is operative, when energized in response to a "close" command from the controller, to move the field switch contact 12C to its closed position in which it is held by the energized control means, and it communicates with "CONTACTOR DRIVERS" (block 29) which are suitably constructed and arranged to actuate the individual traction motor contactors 15C, 16C, etc. Typically the contactor drivers 29 are pneumatic mechanisms controlled by associated electromagnetic valves which in turn are controlled, selectively or in unison, by commands from the controller 26.

For the purpose of responding to ground faults in the propulsion system, the controller 26 is supplied, via the output line 23 of the current detecting module 22, with the aforesaid feedback signal whose value varies with the magnitude IGND of ground leakage current. If this signal indicates that IGND is abnormally high, the controller automatically executes certain protective functions and, at the same time, sends appropriate messages or alarm signals to a display module 30 in the cab of the locomotive. Preferably the ground fault protective functions implemented by the controller 26 are the same as or equivalent to those disclosed in the previously cited prior art Canadian patent 1,266,117 granted on Feb. 20, 1990, and assigned to General Electric Company, and the disclosure of that patent is expressly incorporated herein by reference. In summary, the referenced protection is effective to modify the value of the control signal VC on line 19 when ground leakage current is abnormally high so that: (1) if the ground current magnitude is in a range between a predetermined deration threshold level and a predetermined maximum permissible limit, the magnitude of alternator field current IF is reduced and consequently the power output of the main alternator 12 is reduced to a fraction of its normally desired amount, which fraction varies inversely with the magnitude of ground current in excess of the deration threshold level, and (2) the power output is restricted to zero for at least a minimum interval of time if the ground current magnitude increases above its maximum limit.

In the preferred embodiment of the present invention, the controller 26 comprises a microcomputer. Persons skilled in the art will understand that a microcomputer is actually a coordinated system of commercially available components and associated electrical circuits and elements that can be programmed to perform a variety of desired functions. In a typical microcomputer, a central processing unit (CPU) executes an operating program stored in an erasable and electrically reprogrammable read only memory (EPROM) which also stores tables and data utilized in the program. Contained within the CPU are conventional counters, registers, accumulators, flipflops (flags), etc., along with a precision oscillator which provides a high-frequency clock signal. The microcomputer also includes a random access memory (RAM) into which data may be temporarily stored and from which data may be read at various address locations determined by the program stored in the EPROM. These components are interconnected by appropriate address, data, and control buses. In one practical embodiment of the invention, an Intel 8086 microprocessor is used.

The controller 26 is programmed to produce, in the motoring mode of operation, a control signal value on the line 19 that varies as necessary to zero any error between the value of the alternator voltage feedback signal V and a reference value that normally depends on the throttle position selected by the locomotive operator and the traction power output of the main alternator. The presently preferred manner in which this is accomplished is disclosed in U.S. Pat. No. 4,634,887- Balch et al, issued Jan. 6, 1987, and assigned to General Electric Company, which disclosure is expressly incorporated herein by reference. In order to implement an electrical braking mode of operation, the controller 26 is programmed to vary the value of the control signal VC as necessary to zero any error between a motor armature current feedback value and a reference value that normally depends on the dynamic brake position selected by the locomotive operator.

In accordance with the present invention, the above-described propulsion system includes means for protecting the traction motors from flashovers. The desired flashover protection is implemented by the controller 26 in cooperation with the main alternator excitation current source 17. The parts of the controller that are involved in flashover protection are shown in simplified form in FIG. 3 where the block 32 represents suitable means for detecting the occurrence of a flashover on the commutator of any one of the d-c traction motors 15, 16, etc.

The detecting means 32 receives the family of traction motor current feedback signals I1, I2, etc. and the ground leakage current (IGND) feedback signal on line 23. It is operative to produce a fault signal on an output line 33 (labeled "FLASH" in FIGS. 3-7) whenever a flashover occurs, as indicated by an abnormal rise in the magnitude of at least one current feedback signal in the event either (1) the magnitude of armature current in any traction motor exceeds a predetermined threshold which is higher than the magnitude of armature current under all normal conditions, or (2) the magnitude of IGND exceeds another threshold (e.g., 2.5 amperes) which is higher than the maximum permissible limit of leakage current above which the above-mentioned ground fault protective function clamps the control signal VC to its zero traction power value. The threshold magnitude of motor armature current is preferably nearly twice the maximum current that each traction motor will normally conduct; in one practical application of the invention, a threshold magnitude of 3,000 amperes has been selected. In order to respond as quickly as possible to the occurrence of a flashover, the detection function is preferably performed by means of analog circuitry rather than by the microcomputer.

Figure 4:
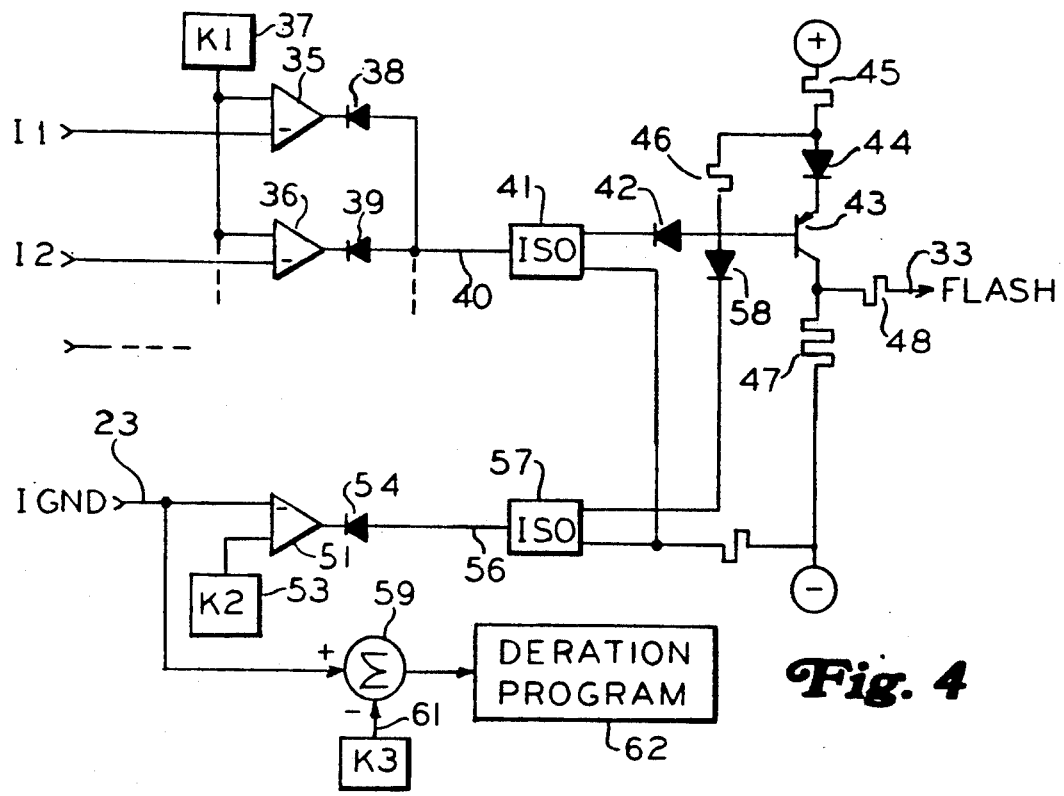
FIG. 4 is a schematic circuit diagram of the flashover detecting means shown as a single block in FIG. 3.

The presently preferred embodiment of the flashover detection means 32 is shown in FIG. 4 and will now be described. The motor armature current feedback signals I1, I2, etc. are respectively supplied to first inputs of an array of comparators 35, 36, etc. The second inputs of the same comparators are connected in common to suitable means 37 for deriving a bias signal of predetermined constant magnitude K1 corresponding to the aforesaid high threshold magnitude of motor current.

The outputs of these comparators are respectively coupled through diodes 38, 39, etc. to a line 40 which in turn is connected through a buffer 41 and another diode 42 to the base of a PNP transistor 43. The emitter of the transistor 43 is connected via a diode 44 and a resistor 45 to a control voltage bus (+) of relatively positive constant potential, and a resistor 46 is connected between the transistor base and the junction of the diode 44 and resistor 45. The collector of the transistor 43 is connected via a resistor 47 to a reference potential bus represented in FIG. 4 by a circled minus symbol, and it is also connected via a resistor 48 to the output line 33 of the flashover detector. Normally, none of the feedback signals I1, I2, etc. has a magnitude exceeding K1, all of the comparators 35, 36, etc. have high outputs, the diodes 38, 39, etc. are reverse biased (i.e., non-conducting) and the signal on the line 40 is high, the transistor 43 is turned off, there is no current in resistor 47, the potential of the transistor's collector (and also of the line 33) is low or zero with respect to the reference potential, and no fault signal is being outputted by this detector. However, if and when any one (or more) of the motor current feedback signals rises above K1, the output of the associated comparator will switch to a low state which causes the signal on line 40 to be low and the diode 42 to conduct, thus forward biasing the emitter-base junction of the transistor 43 which now turns on and conducts current through its collector resistor 47, thereby raising the collector potential and producing a high fault signal on the output line 33.

As can be seen in FIG. 4, the current feedback signal on line 23, representing the magnitude of ground leakage current IGND in the armature windings of the traction alternator 12, is supplied to one input of an additional comparator 51, the other input of which is connected to suitable means 53 for deriving another bias signal of predetermined constant magnitude K2 corresponding to the aforesaid high threshold magnitude of IGND. The output of comparator 51 is coupled through a diode 54 to a line 56 which in turn is connected through a buffer 57 and a diode 58 to the base of the transistor 43. Normally the magnitude of the ground current feedback signal does not exceed K2, the comparator 51 has a high output, the diode 54 is reverse biased (i.e., non-conducting), and the signal on the line 56 is high. However, if and when the magnitude of this feedback signal rises above K2, the output of comparator 51 is switched to a low state which causes the signal on line 56 to be low and the diode 58 to conduct, thereby turning on the transistor 43 and producing a high fault signal on the output line 33. In effect, the diodes 42 and 58 form an "OR" logic circuit which enables the detector to produce a fault signal in response to an abnormal magnitude increase of either the ground leakage current in the alternator armature windings or the armature current in any one of the traction motors, such increase being caused in either case by a flashover on a motor commutator.

As is shown in FIG. 4, the ground leakage current feedback signal on line 23 is also supplied to summing means 59 where another signal on a line 61 is subtracted therefrom. The signal on line 61 has a predetermined constant magnitude K3 corresponding to the deration threshold level of IGND (e.g., approximately 0.5 ampere). If IGND is higher than this level, the resultant value from the summing means 59 activates a deration program 62. As is fully disclosed in the previously cited Canadian patent 1,266,117, the deration program 62 modifies the value of the control signal VC on the line 19 (see FIG. 1) in a manner that reduces the magnitude of alternator field current so that the power output of the alternator 12 is reduced to a fraction of its normally desired amount, which fraction is inversely proportional to the magnitude of leakage current in excess of the deration threshold level, and equals zero if the leakage current magnitude exceeds its maximum permissible limit (e.g., approximately one ampere). Note that K2 is higher than the magnitude of the feedback signal on line 23 when the last-mentioned limit is reached.

Returning to FIG. 3, the fault signal that the detecting means 32 produces on the output line 33 whenever a flashover occurs is supplied to the alternator excitation current source 17 via the data link 21. In accordance with the present invention, the excitation source 17 is provided with a solid-state controllable electric valve in the path of the alternator field current for quickly decoupling this source from the alternator field windings 12F in response to a fault signal being produced, whereupon the magnitude of excitation current in the alternator field is rapidly reduced toward zero and the output voltage of the main alternator 12 is correspondingly decreased. The organization, operation, and advantages of this part of the flashover protection means will now be described in more detail with reference to FIG. 5 which illustrates the presently preferred embodiment of the excitation current source 17. The illustrated source 17 comprises a 3-phase double-way rectifier bridge 64 formed by the interconnection of six controllable, unidirectional electric valves or thyristors having gates which respectively receive periodic firing or turn-on signals from conventional control means 65 shown as a block labeled "thyristor bridge control," such firing signals being synchronized with 3-phase alternating voltages that are applied to three a-c input lines 18 of the bridge 64. The latter voltages are obtained from auxiliary windings of the alternator 12, whereby their frequency and amplitude will vary with the rotational speed (RPM) of the prime mover. Typically the input voltage magnitude is in a range from approximately 30 volts rms at idle speed to 68 volts rms at full speed. In order to achieve the desired alternator field regulation as previously described, the control means 65 is operative to advance or to retard the timing of the firing signals as a function of any error between the control signal VC on line 19 and the feedback signal representative of the alternator output voltage V.

Figure 5:
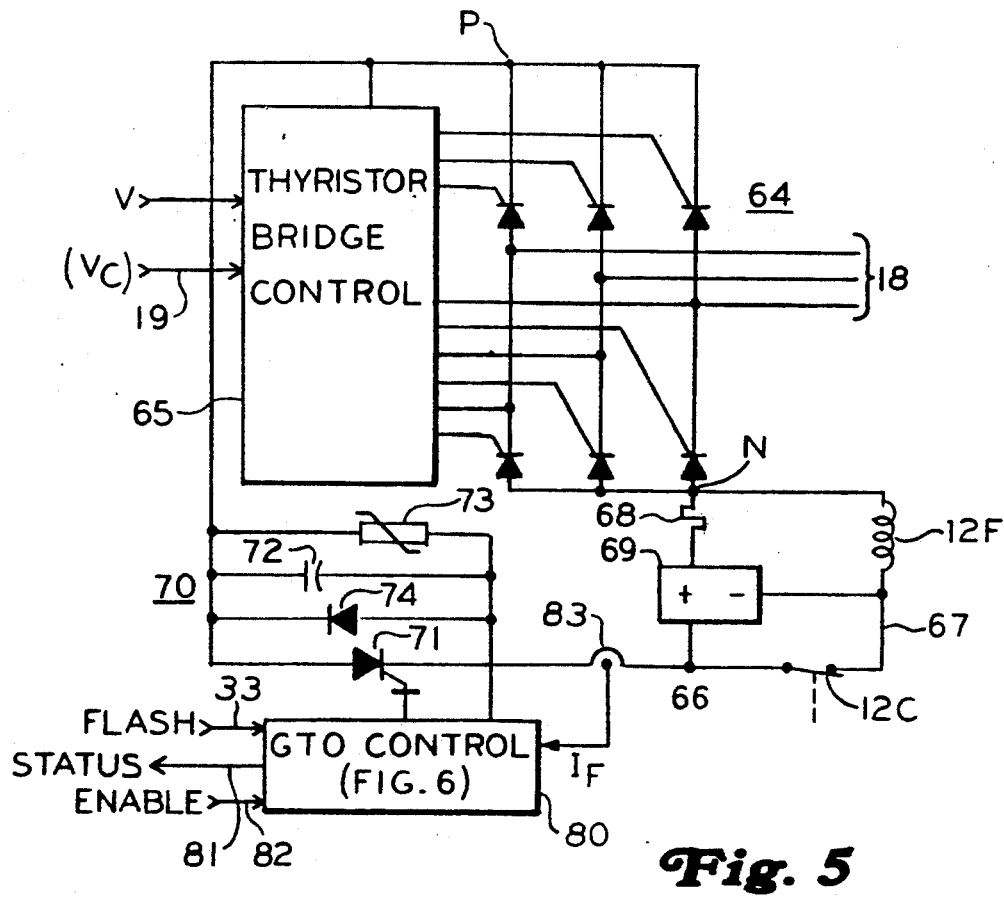
FIG. 5 is an expanded diagram of the generator excitation current source shown as a single block in FIGS. 1 and 3.

As is shown in FIG. 5, the negative d-c output terminal N of the rectifier bridge 64 is connected directly to one end of the field windings 12F of the main alternator, and the relatively positive output terminal P of this bridge is connected to the other end of the field 12F by means of a line 66, the normally closed contact 12C of the alternator field switch, and a line 67. The field 12F and the contact 12C are shunted by a voltage limiting resistor 68 of relatively small ohmic value (e.g., two ohms), in series with a bipolarity voltage breakover device 69 having a positive terminal connected to the line 66 and a negative terminal connected to the line 67. The breakover device 69 in its normal state provides a very high resistance and is essentially an open circuit. However, it is suitably constructed and arranged to switch abruptly to a negligible resistance state if either the potential of line 67 is negative and exceeds a first predetermined breakover level with respect to output terminal N of the bridge 64 (e.g., 1,000 volts) or the potential of line 66 is relatively positive and exceeds a second breakover level which can equal or differ from the first breakover level. So long as the device 69 is in the latter state, any excitation current in the field 12F will circulate or "free wheel" through the 2-ohm resistor 68.

Controllable circuit means 70 is connected in series with the field switch contact 12C between the positive output terminal P of the bridge 64 and the line 66. In the illustrated embodiment of the invention, the circuit means 70 comprises a high-speed, solid-state controllable electric valve 71 connected in parallel circuit relationship with electrical impedance means which in turn comprises a snubber capacitor 72 in parallel with a non-linear resistance element 73. Preferably, as is indicated in FIG. 5, the valve 71 is a gate turnoff device (GTO). Alternatively, this valve could comprise a power transistor or a conventional combination of a silicon controlled rectifier and external commutation means.

The GTO device 71, usually referred to as a GTO thyristor, is a multilayer semiconductor designed to freely conduct "forward" load current (i.e., current flowing into its anode and out of its cathode) when its gate electrode is triggered by a suitable turn-on or firing signal and to effectively block such current after a negative turn-off signal is alternatively applied to the same gate. In one application of the invention, this thyristor is rated to conduct steady state unidirectional load current of 450 amperes when turned on and to withstand a forward voltage in excess of 1,600 volts when turned off, such thyristor being capable of successfully turning off current as high as 1,200 amperes in response to a turnoff signal of suitable magnitude. The GTO 71 is poled to conduct excitation current when turned on. To protect the GTO thyristor from damage in the event of a voltage surge of reverse polarity, it is shunted by an inversely poled diode 74 which could alternatively be embodied in the GTO structure if desired.

Whenever the GTO thyristor or valve 71 is in a turned on state, it presents negligible resistance to forward load current. Now excitation current can freely flow from terminal P through the circuit means 70, the contact 12C (assumed closed), and the main alternator field 12F to the terminal N. But in its turned off state the valve resistance has such a high ohmic value as to block or interrupt forward load current. To change the GTO valve 71 between these two alternative states, suitable control means 80, labeled "GTO Control," is associated therewith. The control means 80 is operative in response to receipt of a fault signal on the line 33 to change the GTO valve 71 from first to second states and at the same time to change a normally high ("1") "status" signal on an output line 81 to a low ("0") state. The control means 80 is also operative in response to receipt of an "enable" signal on an input line 82 to change the GTO valve 71 from second to first states. A current sensor 83 in the line 66 is coupled to the control means 80 to provide a feedback signal representative of the magnitude of excitation current (IF) being supplied to the alternator field 12F.

The non-linear resistance element 73 in the circuit means 70 is commonly called a "varistor." It is made of suitable material (e.g., silicon carbide) that decreases in ohmic value as the magnitude of applied voltage increases, whereby current through the element varies as a power n of such voltage. Typically n is greater than 3. A useful form of varistor is known as a Thyrite disk. In one application of the invention, the illustrated element 73 comprises an assembly of two Thyrite disks in parallel. Its resistance (at 25° C.) is approximately 1,100 ohms when there is 150 volts across the element and decreases to less than two ohms if the applied voltage increases to 1,600 volts.

When a flashover occurs and the GTO valve 71 is turned off by the control means 80 in response to the fault signal produced on the line 33 by the flashover detecting means 32, alternator field excitation current is rapidly transferred ("commutated") from the valve 71 to the parallel impedance means 72, 73 where it encounters a high resistance. The capacitor 72 limits the rate of change of voltage across the GTO valve. Being non-linear, the resistance of the varistor 73 decreases as the voltage across the turned-off valve 71 rises and limits the maximum level of this voltage to a safe value. The turn off process of the GTO valve 71 actually has three stages. Once a GTO turnoff signal is applied to the gate of this valve, there is a brief delay (known as the "storage" time) before forward load current begins to decrease. Then, during a very short interval known as the "fall" time, current decreases rapidly to a very low magnitude. The turnoff time of valve 71 (e.g., approximately 15 microseconds) is the sum of the storage and fall times. However, the turnoff signal must not be removed before the end of a longer interval (known as the "tail" time) which is required for the valve to recover fully its ability to withstand off-state voltage without prematurely reverting to a turned on state. During the latter interval the valve will continue to conduct a relatively small amount of forward load current (known as "tail" current) as its resistance increases and the voltage across it rises. At the conclusion of this process, there is no load current in the GTO valve 71, the off-state voltage applied to the main electrodes of this valve is the same as the voltage across the d-c output terminals P,N of the rectifier bridge 64, (e.g., approximately 50 volts), and the bridge 64 is effectively decoupled from the alternator field windings 12F.

During the valve turn off process summarized above, the high impedance of the varistor 73 is inserted in the path of alternator field excitation current. This immediately reduces the magnitude of current in the alternator field. The rapidly changing current induces a high voltage in the field windings 12F. This voltage soon attains the negative breakover level of the breakover device 69, whereupon the latter device will switch to its negligible resistance state, thereby connecting the 2-ohm resistor 68 across the field 12F and permitting a portion of the field current to circulate through the resistor 68 as field current continues to decrease. The reduction in field current magnitude causes a much larger current reduction in the armature windings of the main alternator 12, and the alternator output voltage and current rapidly decrease. FIG. 2B demonstrates that the alternator output current decrease, per ampere of field current reduction, varies from approximately five amperes to nearly 15 amperes, depending on the magnitude of alternator output voltage V. The advantageous results of quickly inserting impedance in the excitation current path and decoupling the rectifier bridge 64 from the alternator field 12F will be better understood from the following explanation of the alternator's response to flashovers.

The main alternator 12 is a high-reactance, salient-pole synchronous machine without damping or amortisseur windings. If the load circuit connected to the output terminals of the armature windings of this machine were short-circuited by a flashover, the amplitude of armature current would tend to increase abruptly to a peak much higher than normal and then to decay with time. The initial current increase in the armature windings produces magnetomotive force (MMF) that almost directly opposes the field MMF, whereby tending to demagnetize or weaken the resultant magnetic field in the stator-rotor air gap of the machine. The demagnetizing MMF induces extra current in the field 12F so that the total flux linkages will remain constant. The control means 65 for the controlled rectifier bridge 64 in the excitation current source 17 responds to the resulting change in output voltage V by initiating corrective action, but its response time is too slow and the bridge 64 has insufficient voltage to prevent this field current increase. So long as the excitation current source 17 remains unchanged, the initial peak magnitude of short circuit current is determined by the transient reactance of the alternator (more precisely, the direct axis transient reactance) and the reactance in the current path between the alternator armature windings and the traction motor whose commutator flashed. The time constant of the ensuing current decay is determined by the electrical inductance and resistance in the path of the excitation current. As soon as the above-described GTO valve 71 starts turning off and the resistance in the latter path is effectively increased, this time constant becomes significantly smaller and excitation current will very rapidly decay toward zero. In effect, the reactance of the alternator rapidly increases from its initial relatively low transient value (which is no more than approximately 30% of the machine's steady state synchronous reactance) to the value of its synchronous reactance, and the armature current magnitude is decreased correspondingly. If the excitation current source is quickly decoupled from the field 12F as described, the output current of the alternator 12 will begin to decrease from its initial surge before reaching the maximum available short-circuit magnitude. In one application of the invention, peak short circuit current to a faulted motor has been limited to approximately 18,000 amperes in a propulsion system capable of supplying 28,000 amperes or more without this improved flashover protection means, and the electrical energy in the faulted motor circuit has been limited to about 25% of what it would otherwise be.

Figure 6:
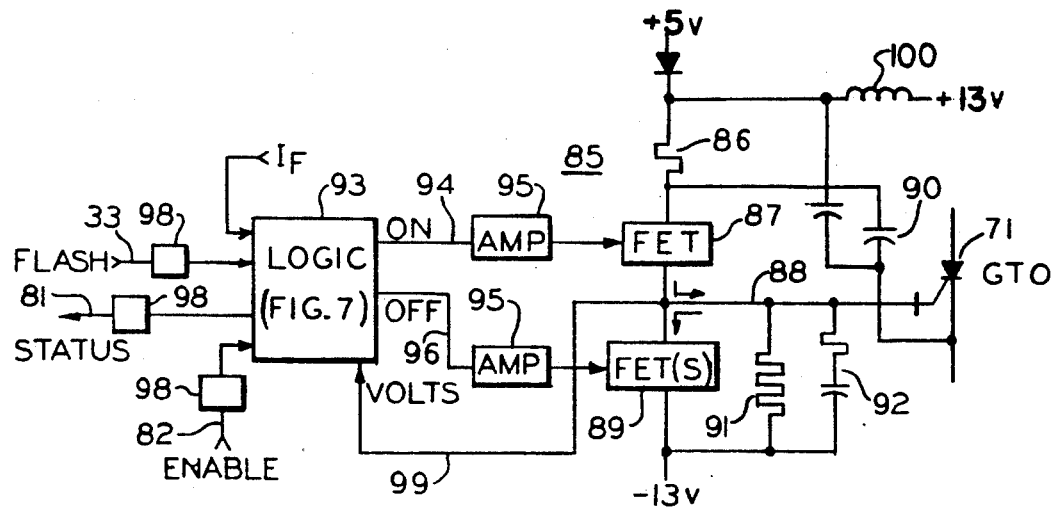
FIG. 6 is an expanded block diagram of the GTO control means shown as a single block in FIG. 5.

As previously described, the GTO valve 71 in the circuit means 70 is changed between its on and off states by the control means 80 in response to the fault signal on line 33 and the enable signal on line 82. The presently preferred embodiment of the control means 80 is illustrated in FIG. 6 which will now be described. It comprises suitable gating means 85 for supplying the gate electrode of the valve 71 with either a positive current that effects turn-on of this device, or a relatively negative current that effects turn-off of the same device. To supply the turn-on signal, a suitable source of positive potential of approximately 5 volts with respect to the cathode potential of valve 71 is connected to the gate of the GTO valve 71 through a resistor 86 of low ohmic value (e.g., 0.5 ohm), a first controllable solid-state switch 87, and a line 88. Preferably the switch 87 is a conventional power field effect transistor (FET). A capacitor 90 is connected between the high side of this switch and the cathode of the GTO valve 71. When the state of the first switch 87 is changed from non-conducting to conducting, the +5 volts turn-on signal source is immediately applied to the GTO gate electrode. Preferably this source includes electric energy storing means (e.g., a capacitor of relatively high capacitance value per pre-charged to a higher level of voltage, for example 13 volts) that rapidly discharges when the switch 87 starts conducting so that an initial pulse of turn-on energy is supplied to the gate-cathode junction of GTO 71, after which the switch 87 continues conducting the required holding current from the +5 volts source. To supply the turnoff signal for the GTO valve 71, its gate is connected to a control voltage terminal having a negative potential of approximately 13 volts with respect to the GTO cathode through the line 88 and a second controllable solid-state switch 89 which preferably comprises a parallel array of two or more FETs arranged to turn on and off in unison. The second switch 89 is shunted by a resistor 91 and also by a circuit 92 comprising another resistor in series with a capacitor. When the second switch 89 changes to its conducting (turned-on) state, the latter capacitor will discharge through this switch, thereby reversing the direction of current in the line 88. Current in the gate-cathode junction of the GTO valve will change rapidly (e.g., approximately 40 amps per microsecond) from its positive holding current magnitude (e.g., +6 amperes) to a peak negative magnitude (e.g., approximately 100 amperes or more, depending on the magnitude of load current being commutated) that restores the valve's ability to block forward load current. Once the GTO valve turns off and the tail time expires, it will remain off until another turn-on signal is applied to its gate, and the resistance of its gate-cathode junction will limit the negative gate current to a trivial magnitude. The gate potential of the GTO valve is slightly above cathode potential when this device is on, and is nearly the same as the potential of the −13 volts terminal when the valve 71 is off and the second switch 89 is turned on.

The conducting states of the two switches 87 and 89 are selectively controlled by associated logic means 93 so that only one switch is conducting (turned on) at any time. A first output line 94 of the logic means 93 is coupled through an amplifier 95 to the control terminal of the first switch 87, and a second output line 96 is coupled through a duplicate amplifier 95 to the control terminal of the second switch 89. The logic means 93 is supplied with both the fault signal on the line 33 and the enable signal on line 82. The lines 33 and 82 are respectively connected to two different inputs of the logic means through suitable optical couplers 98. The logic means 93 is also supplied with a feedback signal representative of the magnitude of current IF in line 66 of the excitation current path (as sensed by the current sensor 83 in FIG. 5), and it is coupled to the second switch 89 via a line 99 which supplies it with a feedback value that is a measure of the voltage magnitude across the switch 89. In a manner that is explained hereinafter, the logic means 93 responds to its various input signals by providing the following alternative combinations of signals on its respective output lines 94 and 96: (1) the output signal on the line 94 has a high or "ON" state that causes the first switch 87 to conduct, thereby changing the controllable GTO valve 71 to its turned-on state, while the signal on the line 96 is concurrently low so as to bias the second switch 89 to its non-conducting state; or (2) the output signal on the line 96 has a high or "OFF" state that causes the second switch 89 to conduct, thereby changing the GTO valve to its turned-off state, while the signal on the line 94 is concurrently low so as to bias the first switch 87 to its non-conducting state; or (3) the signals are low on both of the output lines 94 and 96.

The presently preferred embodiment of the logic means 93 employs a plurality of dual input analog logic circuits suitably interconnected and arranged to perform the various functions that will now be described with reference to FIG. 7. For the sake of convenience, the individual logic circuits have been shown symbolically in a somewhat simplified form in FIG. 7 and are hereinafter called "units." One type of unit has a high ("1") output state only when its first input is high and its other input is low ("0"), the latter input being referred to as a "not" input. In practice, this same function could be performed by other equivalent logic circuits, such as the combination of a conventional AND logic circuit with a polarity inverter ahead of its second input, or the combination of a conventional NOR logic circuit with a polarity inverter ahead of its first input.

Figure 7:
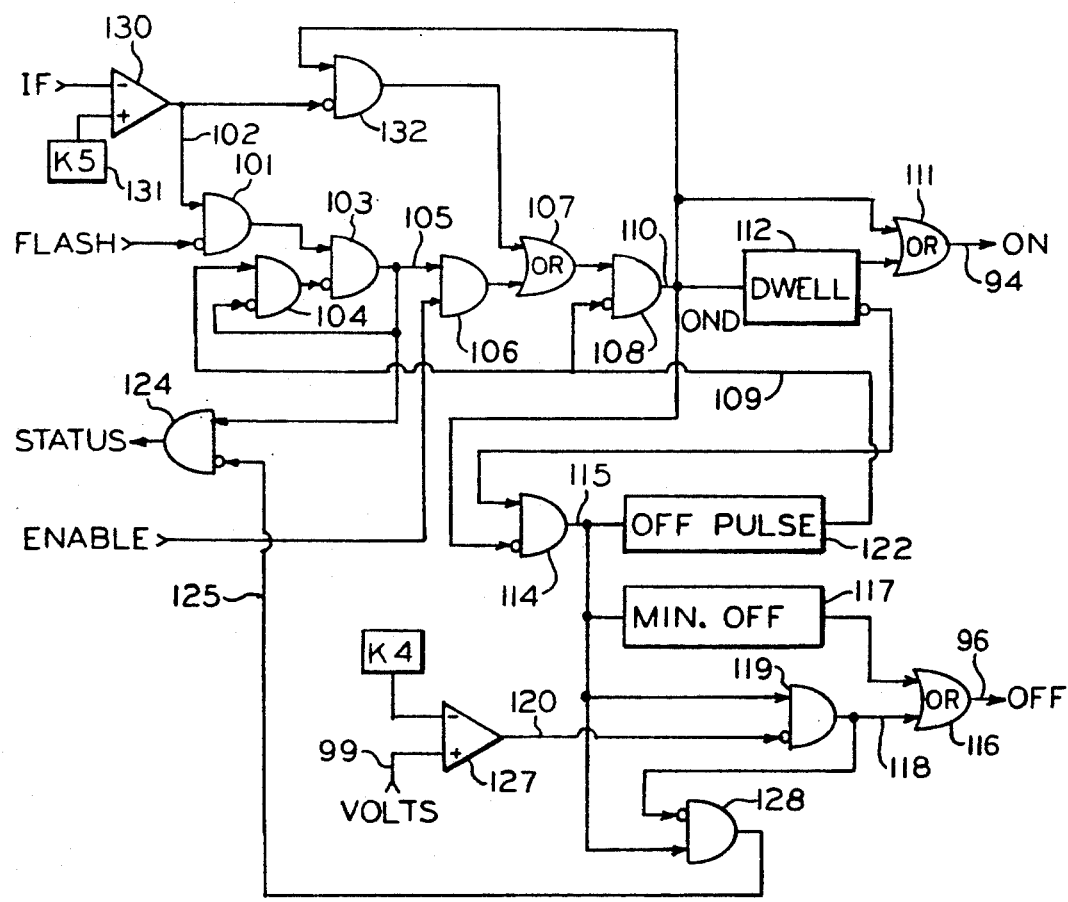
FIG. 7 is a functional block diagram of the logic means represented by a single block in FIG. 6.

As is shown in FIG. 7, the fault signal is coupled to the "not" input of a first unit 101. The first input of the unit 101 is connected to a line 102 on which a normally high signal is provided, and the output of this unit is normally in a high state because its not input is low in the absence of a fault signal. The output of the first unit 101 is connected to the first input of a second unit 103, and the not input of the latter unit is connected to the output of a third unit 104 which normally has a low output state. The output of the second unit 103, which normally is in a high state, is connected via a line 105 to the first input of an AND logic unit 106. The enable signal is coupled to the second input of the latter unit. As will be explained in more detail hereinafter, so long as the control means 12D is energized to close the contact 12C of the alternator field switch, the enable signal is high; otherwise, the second input of the AND unit 106 is low.

Assuming the field switch contact 12C is closed (its normal state), the normal output state of the AND logic unit 106 is high. The output of this unit is coupled through an OR logic unit 107 to the first input of another unit 108 whose not input is connected to a line 109 on which there is normally no high signal. Consequently, the output state of the logic unit 108 is normally high. The latter unit provides a command signal "OND" on a line 110 which is connected to its output. This signal has first and second alternative states; its first state is high and coincides with the normally high output state of unit 108, whereas its second state is low and coincides with a low output state of unit 108.

Between the output line 110 of the unit 108 and the first output line 94 of the logic means 93 there is an OR logic unit 111 having two inputs. The first input of this unit is connected directly to the line 110, whereby the unit 111 is effective to produce a high signal on the output line 94 (i.e., the aforesaid ON state for turning on the GTO valve 71) concurrently with a high command signal OND on the line 110. The second input of the unit 111 is also connected to the line 110 but through a first timer 112 labeled "dwell" in FIG. 7. The timer 112 is a conventional "one-shot" time delay circuit, the first output of which is normally low but will change to a temporary high state as soon as the signal applied to the input of the circuit changes from low to high, will then remain high for a fixed interval of time even if the input signal changes sooner from high to low, and will automatically return to its normal low state at the end of such interval even if the input signal remains high. The purpose of the dwell timer 112 is to ensure that any turn-on signal applied to the gate of the GTO valve 71 has at least a desired minimum duration (e.g., 65 microseconds) in order to allow the parallel capacitor 72 to discharge fully each time the state of the GTO valve 71 is changed from off to on. Therefore this timer is suitably adjusted so that the interval of its one-shot high output state equals such minimum duration.

The output line 110 of the unit 108 is also connected to a not input of another unit 114, and a second, normally high output of the first timer 112 is connected to the first input of the latter unit. Consequently, the output state of the unit 114 is the opposite of the state of the signal on the first output line 94. As can be seen in FIG. 7, an output line 115 of the unit 114 is connected to the second output line 96 of the logic means 93 by means of an OR logic unit 116 having two inputs, one input being connected through a second timer 117 (labeled "min off") to the line 115 and the other input being connected via a line 118 to the output of yet another unit 119 the first input of which is connected to the line 115 and the not input of which is connected to a line 120 on which a high signal is provided when the GTO valve is on but not when the GTO valve is off under normal conditions. So long as the command signal OND on the line 110 is high, the signal on line 115 is low and therefore the output state of the OR logic unit 116 is low. But when the command signal changes to a low state in response to either one of the high signals at the inputs of the AND logic unit 106 being removed, as would occur if a high fault signal were applied to the not input of the first unit 101, the signal on output line 94 changes state from high to low and the signal on line 115 goes high (but not before the dwell timer 112 has returned its first and second outputs to their respectively low and high normal states). The min-off timer 117, which is essentially the same as the one-shot dwell timer 112, responds to the low-to-high transition of the latter signal by temporarily supplying a high signal to the OR unit 116 which consequently produces a high signal on the second output line 96 (i.e., the aforesaid OFF state for turning off the GTO valve 71). Once produced in this manner, the high signal on line 96 will remain high for a desired minimum interval measured from the moment of time when the signal on line 115 changed from low to high states. The timer 117 is suitably adjusted to ensure that the duration of any turnoff signal applied to the gate of the valve 71 will equal or exceed the sum of the aforesaid turnoff and tail times of this valve.

The line 115 is also connected through a third timer 122 (labeled "off pulse") to the line 109. The off-pulse timer 122 is similar to the dwell timer 112, and it is operative to prevent the command signal OND, after changing from high to low states, from resuming its high state for a predetermined period (e.g., approximately one second) in order to delay the next GTO turnon signal. This delay period serves two purposes. It ensures that the GTO valve 71 when turned off can not be returned to its on state before certain system response functions are completed, as will soon be described with reference to FIG. 8. It also allows the snubber capacitor 72 to discharge, through the parallel varistor 73, to the relatively low level (e.g., approximately 50 volts) of the output voltage of the rectifier bridge 64 before the valve 71 is returned to an on state. Note that the capacitor 72 is charged to a high voltage (e.g., 1600 volts or more) as alternator excitation current IF is commutated from the GTO valve 71 to the impedance means 72, 73 during the turn off process of this valve (see the earlier description of FIG. 5). Because of the off-pulse delay, however, there is ample time for the capacitor to discharge such high voltage before the next GTO turn-on signal is produced, and the relatively small residual charge will not cause damage or untoward switching losses when the valve is again turned on. Consequently, the GTO snubber circuit is simplified and its cost and size are minimized by omitting a conventional current limiting resistor (shunted by a diode poled to conduct charging current) in series with the capacitor 72.

In operation, the off-pulse timer 122 shown in FIG. 7 has a normally low output, but as soon as the signal on line 115 changes from low to high, its output changes to a high state and thereafter automatically returns to normal at the end of the predetermined delay period. This temporary high output is coupled by the line 109 to the not input of the unit 108, and consequently the output state of the latter unit remains low concurrently with the high output of the timer 122. It is also coupled by the line 109 to the first input of the third unit 104, the not input of which is connected to the line 105 and has the same state as the output of the second unit 103. It will be apparent that normally the output state of the unit 104 is low and the signal on the line 105 is the same as the high signal being applied to the first input of the unit 103, but once a high fault signal is applied to the not input of the first unit 101, the signal on the line 105 changes from high to low states and remains in a low state so long as the output of the off-pulse timer 122 is high.

The line 105 is connected to the first input of another unit 124. The not input of the unit 124 is connected to a line 125 on which normally there is no high signal, and therefore the output of this unit is normally in a high state. The latter output serves as the aforesaid status signal which is provided on the output line 81 of the GTO control means 80. It is high whenever the status of the GTO valve 71 is "good" (i.e., when the GTO valve is turned on and its gate is not shorted). But as soon as a fault signal is supplied to the logic means 93, the signal on the line 105 and consequently the output of the unit 124 will change from high to low, thereby indicating a "bad" status (i.e., the GTO valve is off). Bad status is maintained by the above-described unit 104 for the period that the output of the off-pulse timer 122 is high.

As will soon become apparent (see the description of FIG. 8), the controller 26 includes means responsive to a high-to-low change of the status signal for immediately de-energizing the alternator field switch control means 12D, thereby causing the switch contact 12C to open and the enable signal supplied to the logic means 93 to change from high to low states. Subsequently the control means 12D is re-energized, thereby returning the contact 12C to its normal, closed position and restoring the high state of the enable signal. Throughout the interval that the enable signal is low, the output of the AND logic unit 106 is low, the command signal OND on the line 110 remain low, and no GTO turn-on signal can be produced. But as soon as the high state of the enable signal is restored (assuming that the high fault signal was previously removed and that the output of the off-pulse timer 122 has returned to its normal, low state), the output of unit 106 changes from low to high, the command signal OND returns to its high state, the signal on line 115 goes low, the signal on output line 96 changes states from high to low thereby terminating the GTO turnoff signal, and concurrently the signal on output line 94 changes from low to high thereby causing the GTO gating means 85 to apply a turn-on signal to the gate of the GTO valve 71.

In the event the GTO valve 71 has a shorted gate, this device will fail to turn off when a turnoff signal is applied to its gate. The logic means 93 includes means for detecting this abnormal event and for protecting the GTO control means 80 from resulting damage. The latter means preferably incorporates the shorted gate detection and protection features that are disclosed and claimed in copending U.S. patent application (20-LC-1571) filed concurrently herewith for R. B. Bailey and H. J. Brown and assigned to General Electric Company. As is illustrated in FIG. 7, it comprises the min-off timer 117, the logic unit 119, and suitable means 127 for comparing the feedback value on line 99 (i.e., the actual volts across the turnoff switch 89 in FIG. 6) with a predetermined, relatively small reference magnitude K4 (e.g., approximately 0.7 volt). K4 is selected to be equal to the voltage developed across the turnoff switch 89 whenever this switch is in its conducting state and negative current in the gate of the GTO valve 71 equals a certain high threshold magnitude (e.g., approximately 100 amps) that is normally experienced only during the turnoff and tail times of a successful turn off process of this valve, and it is much less than the volts across the switch 89 when biased to its non-conducting state. The comparing means 127 has a high output state so long as the feedback value on line 99 is greater than K4, which is true if either the turnoff switch 89 is turned on and conducting high current or both the turnoff switch and the GTO valve are turned off but is not true if the turnoff switch 89 is turned on and not conducting appreciable current. In the latter event, the comparing means output has a low state. The output state of the comparing means 127 is conveyed by means of the line 120 to the not input of the logic unit 119. So long as this input is low, the output of the latter unit (i.e., the signal on line 118) will track the high and low states of the signal on the line 115; otherwise the signal on line 118 is low.

In operation, as soon as the signal on line 115 changes from low to high in response to a high fault signal being supplied to the logic means 93, the output of the min-off timer 117 changes from its normal low state to a high state which subsists until the end of the aforementioned minimum interval. This temporary high output is coupled by the OR logic unit 116 to the second output line 96 of the logic means 93, thereby turning on the turnoff switch 89 which conducts the negative gate current required to turn off the GTO valve 71 as previously described. When the switch 89 initially turns on, the voltage across it collapses to a negligible magnitude and the signal on the output line 120 of the comparing means 127 changes from high to low. Concurrently, the unit 119 causes the signal on line 118 to change from low to high. Thereafter the negative GTO gate current in the switch 89 rapidly increases and soon exceeds the threshold magnitude at which the feedback value on line 99 equals K4, whereupon the signal on line 120 returns to its former high state and the signal on line 118 returns to its former low state. During a normal GTO turnoff process, negative gate turnoff current subsides from a high peak value to a trivial magnitude, and the volts across the turnoff switch 89 will decrease to less than K4 before the end of the tail time of the valve 71. As such voltage decreases below K4, the signal on line 120 again changes to its low state and the unit 119 concurrently changes the signal on line 118 to its high state.

The latter signal is coupled by the OR logic unit 116 to the second output line 96, thereby sustaining the OFF state of the output signal on this line after the output of the min-off timer 117 automatically reverts to its low state at the end of the minimum interval.

However, if the gate of the GTO valve 71 were shorted, negative gate current would not subside during the attempted turn-off process. In this event, the volts across the switch 89 would not decrease below K4, the signal on line 118 would remain low, and the signal on output line 96 would return to a low state as soon as the output of the min-off timer 117 returns to its normal, low state at the end of the minimum turnoff interval. The resulting low signal on the output line 96 will bias the switch 89 to its off state, thereby removing the low-resistance path that this switch would otherwise provide, if it were not turned off, from the gate of the GTO valve to the −13 volts control voltage terminal (see FIG. 6). Interrupting negative current in the shorted gate of the valve 71 will protect the switch 89 from damage caused by continuing to conduct high current after the minimum turnoff interval expires. To ensure proper operation of the shorted gate detector, the minimum turnoff interval is approximately 80 microseconds.

The detection of a shorted gate also causes a low-to-high state change of the signal on the line 125 of the logic means 93. As is shown in FIG. 7, the latter signal is provided by a logic unit 128 whose first input is connected to the line 115 and whose not input is connected to the line 118. The signal on line 118 would be low if a shorted GTO gate were detected after the above-described low-to-high state change on line 115. In this abnormal event, the signal on line 125 is high and the output state of the unit 124 must be low, whereby a bad status will continue to be indicated after expiration of the delay period provided by the previously described off-pulse timer 122.

The logic means 93 includes additional means for preventing the command signal OND on the line 110 from changing from high to low states if the magnitude of alternator excitation current IF exceeds a predetermined abnormally high level (e.g., 1200 amps) which is higher than the maximum excitation current typically attained in response to a flashover, thereby inhibiting the production of a GTO turnoff signal in the event IF is greater than that level. Preferably, as is shown in FIG. 7, the alternator excitation current feedback signal is supplied to a first input of a comparator 130. The other input of this comparator is connected to suitable means 131 for deriving a bias signal of predetermined constant magnitude K5 corresponding to the aforesaid high level of IF which is well above (e.g., 2.5 times higher than) the highest magnitude of IF during normal full-load operation of the propulsion system, but not above the magnitude of IF observed when a flashover occurs. The output of the comparator 130 is normally high but switches to a low state if the value of the excitation current feedback signal exceeds K5. This output is conveyed via the line 102 to the first input of the first unit 101, and it is also conveyed to a not input of yet another unit 132 whose first input is connected to the line 110. The output of the unit 132 is coupled to one of the two inputs of the OR logic unit 107. So long as IF has not attained the predetermined high level, the logic means 93 operates as previously explained. But if IF exceeds this level, the output of comparator 130 changes from high to low states, the signal on the line 105 is changed from high to low thereby causing a corresponding change of the status signal, and the logic unit 132 produces a high output which overrides the AND logic unit 106 and "seals in" the high state of the command signal OND on line 110. So long as OND is high, no GTO turnoff signal will be produced by the GTO gating means 85. This feature of the invention serves two useful purposes. If a diode in the power rectifier bridge 13 fails to block reverse current, the resulting short circuit at the output of the main alternator 12 will cause IF to exceed K5. In this event it is desirable to let the alternator output current rise to a magnitude high enough to blow the protective fuse associated with the failed diode so as to isolate the failed diode from the source of propulsion power. To avoid interfering with this desired response, the additional means 130-32 prevents turn off of the GTO valve 71. The additional means also enables the commutation ability of the GTO valve (i.e., the maximum current that can be successfully turned off by this valve) to be less than the highest possible magnitude of IF, whereby the cost and size of this valve are minimized.

Having described the presently preferred embodiment of the alternator excitation current source 17 as it is shown in FIGS. 5-7, the remainder of the improved flashover protection means will now be described with reference again to FIG. 3. The status signal on the output line 81 of the source 17 is coupled via the data link 21 to the controller 26. As soon as the normally low signal on the output line 33 of the flashover detecting means 32 goes high due to a flashover occurring on the commutator of one or more of the traction motors 15, 16, etc., the GTO control means 80 in the excitation current source 17 simultaneously applies a turnoff signal to the GTO valve 71 and removes the normally high status signal on the line 81. This high-to-low change of the status signal initiates two functions in the controller. The first function, represented in FIG. 3 by a block 140 which is supplied with the family of motor armature current feedback signals I1, I2, etc., identifies any traction motor in which the magnitude of armature current exceeds a predetermined high threshold whenever the status signal changes from high to low. The latter threshold (e.g., approximately 2,000 amps) is greater than the maximum magnitude of armature current under all normal conditions. The identifying function 140 is suitably programmed to read the magnitudes of the current feedback signals, to compare each one with a value corresponding to the aforesaid threshold, and to store the identification number ("#X") of any traction motor(s) whose current is higher than such threshold. Motor #X is presumed to be experiencing a flashover. The identification of the faulted motor is available on an output line 141 of the block 140.

Figure 3:
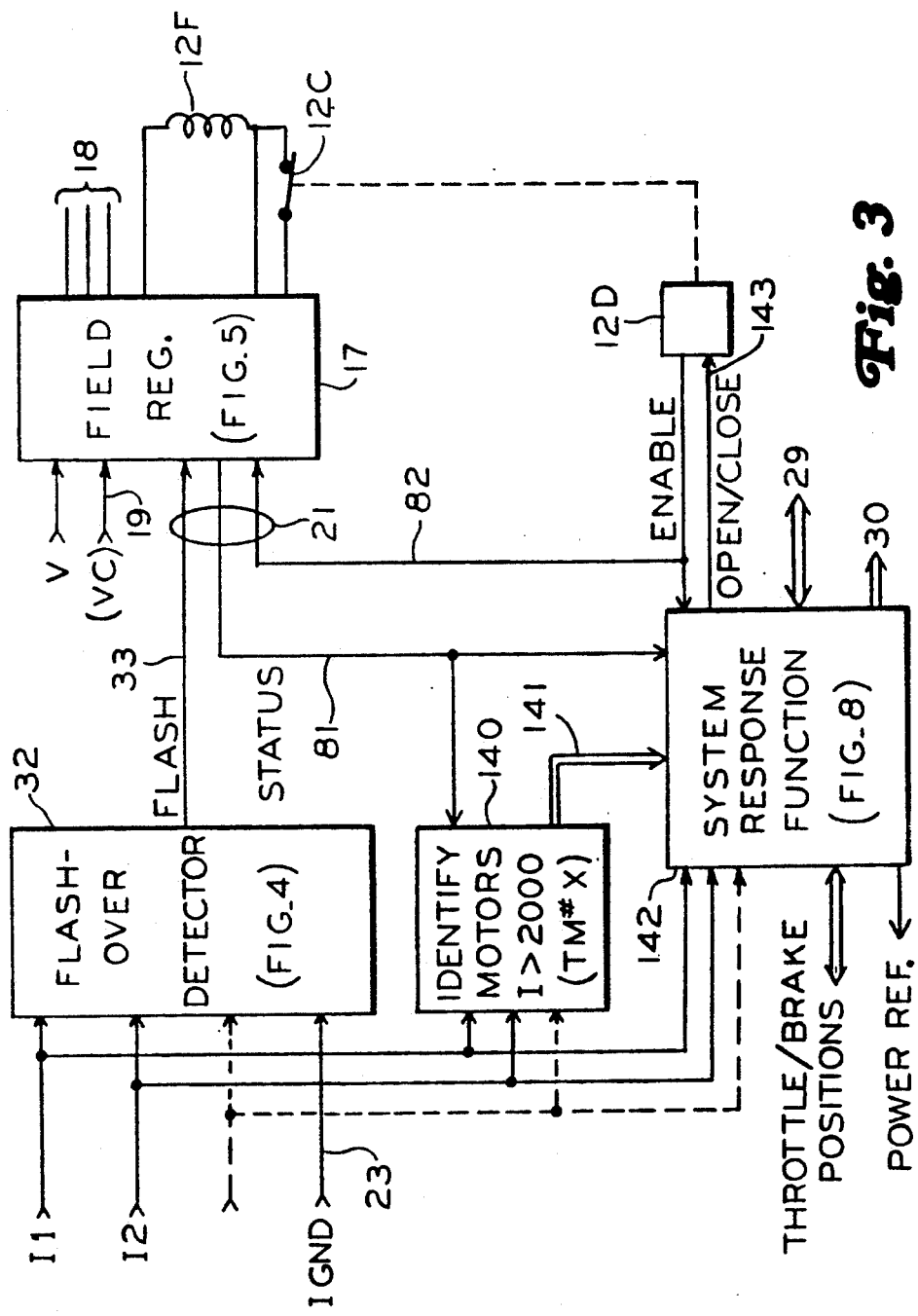
FIG. 3 is an expanded block diagram of certain parts of the controller that cooperate with the generator excitation source to implement the present invention.

The other function initiated by a status change is represented in FIG. 3 by a block 142 labeled "system response function." It is suitably arranged to command the following actions in immediate response to any high-to-low change of the status signal on line 81: the speed call signal for the engine governor system 25 is changed to its idle value; the power reference value in the excitation control means of the controller 26 is reset to zero, thereby temporarily imposing a value corresponding to IF=0 on the control signal VC; a flashover message is entered in the display module 30, and the identification of the faulted motor(s) is logged; an "open" command is transmitted via a line 143 to the field switch control means 12D so as to deenergize 12D which enables the operating mechanism of the contact 12C to move this contact from its normal, closed position to its alternative, open position; contactor opening commands are issued for all of the motor contactors 15C, 16C, etc.; each of these opening commands is transmitted to the operating means 29 of the motor contactors as soon as armature current in the corresponding motor has decreased to a predetermined level that can be safely interrupted by the associated contactor without untoward arcing or welding (but no later than five seconds after the opening commands are issued); and a "flash timer" is activated. As a result of these actions, the firing signals for the controlled rectifier bridge 64 in the excitation source 17 are retarded so that the output voltage of this bridge is soon reduced to zero, the field switch contact 12C in the excitation current path is opened (although the alternator field 12F may continue to be excited by residual current circulating through the resistor 68 and the breakover device 69), and all of the traction motors are disconnected from the d-c bus 14 of the propulsion system. Whenever a flashover is detected, the quick response of the solid-state controllable valve 71 in the excitation current path will cause the alternator output current to decrease very rapidly from its initial surge as previously explained. Consequently, the respective motor currents decrease rapidly, and the time delay between issuing and transmitting contactor opening commands is relatively short. Note that when opening commands are received by the control means 12D and the operating means 29, respectively, the contact tips of the field switch and motor contactors will not separate immediately due to inherent time delays (e.g., approximately 100 milliseconds) in the operation of these electromechanical devices. By the time the contactor in series with the faulted motor is open, the flashover is extinguished and the fault signal on the output line 33 of the flashover detector 32 is removed. The aforesaid enable signal, which is supplied via the line 82 from the field switch control means 12D to the control means 80 in the excitation current source 17, will have a low state so long as the field switch contact 12C is open.

After the actions described in the preceding paragraph are completed, the system response function 142 will command several additional actions: contactor closing commands are transmitted to the operating means 29 of the motor contactors so as to reclose all of the contactors 15C, 16C, etc. except the one(s) associated with the faulted traction motor(s) (i.e., motor #X) as identified by the previously described function 140; a "close" command is transmitted via the line 143 to the field switch control means 12D so as to energize 12D and thereby cause it to return the contact 12C to its closed position; and the engine speed call signal is permitted to return to a value determined by the position of the throttle 27. As soon as the control means 12D receives the close signal on line 143, the enable signal on line 82 changes from low to high states, and the GTO control means 80 in the excitation source 17 automatically responds to such state change by producing a GTO turn-on signal that causes the GTO valve 71 to return to a conducting state as previously described. However, this turn-on signal cannot be produced sooner than approximately one second (the delay period provided by the off-pulse timer 122 in the logic means 93) after the preceding GTO turnoff signal was initiated by a fault signal from the flashover detector 32. The high state of the status signal on line 81 is automatically restored upon the expiration of this one-second delay period (assuming the flashover detector 32 is not producing a fault signal at that time). As a result of removing the idle value restriction on the speed call signal, reclosing the field switch contact 12C, and turning on the GTO valve 71, the alternator excitation current will ramp up to a desired steady-state magnitude, and the electric power that the main alternator 12 now reapplies to the unfaulted traction motors will increase smoothly to whatever level is determined by the throttle position. After a delay determined by the flashover timer in the system response function 142, the operating means 29 is permitted to reclose the contactor associate with motor #X, such reclosure actually occurring the next time the throttle handle is moved through its idle position. If the locomotive speed is relatively high (e.g., 60 miles per hour or more) when a flashover occurs, as is usually true, the delay time is so computed as to obtain a certain number of commutator revolutions, whereby the flashed commutator will be cleaned by the brushes riding over its surface as the rotor of the deenergized motor #X continues to be turned by the locomotive axle to which it is coupled. At lower speeds the delay time has a predetermined maximum length (e.g., 15 minutes).

Figure 8:
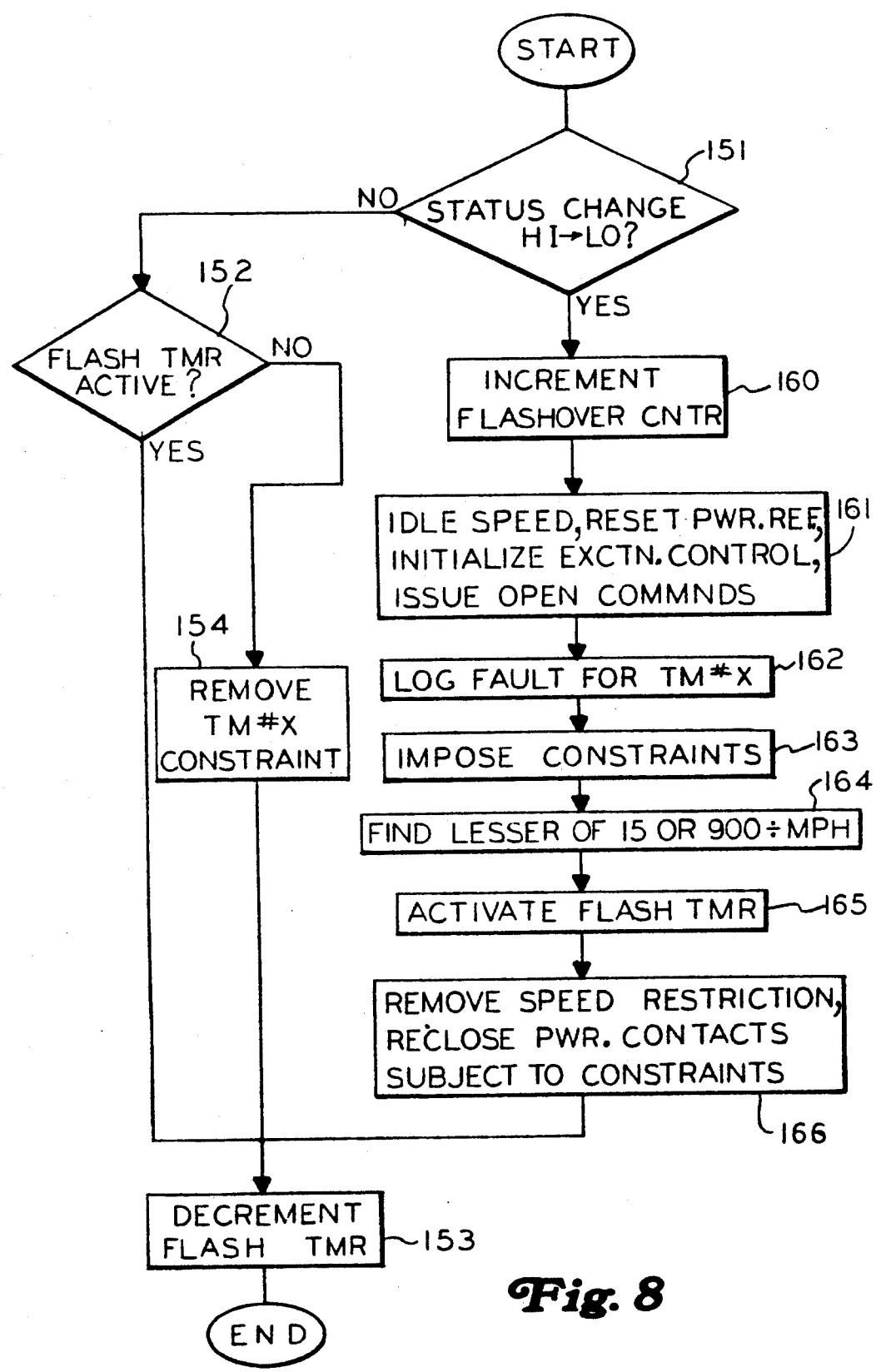
FIG. 8 is a flow chart that explains the presently preferred manner of implementing the system response function represented by a single block in FIG. 3.

Although the system response function could be implemented in a variety of different ways to obtain the results summarized above, the presently preferred way is to program the controller 26 to execute the routine that is illustrated in FIG. 8. This routine is repeated once every ten milliseconds. It begins with an inquiry 151 to determine whether or not the status signal on line 81 has changed from high to low. If not, the routine proceeds to a second inquiry 152 to determine whether or not a flash timer is active. If the answer is affirmative, the next and final step 153 in this routine is to decrement the flash timer by one. Otherwise the routine proceeds from inquiry 152 to the step 153 by way of an additional step 154 that removes any constraint that may be preventing reclosure of the motor contactor associated with a previously faulted traction motor #X. After such constraint has been removed, such contactor can be reclosed by the operating means 29 whenever commanded by the controller 26.

If the answer to the first inquiry 151 were affirmative, the FIG. 8 routine would proceed from this inquiry to the final step 153 by way of a series of steps 160–66 that will now be described. In step 160 a flashover counter is incremented by one. The next step 161 is to change the engine speed call signal to its idle value, to reset the power reference value to zero, to initialize other variables in the excitation control, and to issue opening commands for the field switch control means 12D and the motor contactor operating means 29. (Note that the relevant time constants of the engine fuel system, the alternator field excitation circuit, and their respective controls are such that the alternator output power responds relatively slowly to the execution of step 161, too slowly to be relied on to keep the initial surge of current in the faulted motor from attaining a potentially damaging magnitude.) Step 161 is followed by step 162 in which the identity of the faulted traction motor(s) is fetched from the function 140 (FIG. 3) and then entered in the display module 30. This same information is used in step 163 to impose a reclosing constraint on the contactor(s) associated with such motor(s).

In the next step 164, the FIG. 8 routine computes a certain initial count corresponding to a time delay that is the lesser of 15 minutes or of 900 divided by the actual locomotive speed in units of miles per hour. Then in step 165 the flash timer is activated by loading a register of the microcomputer with the initial count found in the previous step. The flash timer remains active only so long as the count in this register does not reach zero. The initial count is sufficiently large so that the count stored in the register, when decremented at the rate of 100 per second, will reach zero upon expiration of the aforesaid maximum length of time (e.g., 15 minutes) or sooner if the locomotive speed was greater than 60 mph when the initial count was computed. The next step 166 is executed as soon as position sensors in the contactor operating means 29 indicate that all of the motor contactors 15C, 16C, etc. have opened in response to the opening commands issued in step 161. It removes the idle value restriction from the speed call signal, issues a closing command to the field switch control means 12D, and issues commands to the operating means 29 for closing all of the contactors 15C, 16C, etc. except the one(s) associated with the faulted motor(s) #X whose reclosing is prevented so long as the constraint imposed in step 163 is active. The last-mentioned constraint is active until removed by the execution of step 154.

While a preferred embodiment of the invention has been shown and described by way of example, many modifications will undoubtedly occur to persons skilled in the art. For example, the conventional field switch 12C, 12D could be omitted and the valve 71 could be suitably controlled to perform all of its usual functions. In addition, the thyristor bridge 64 in the alternator excitation current source 17 could be replaced with a diode rectifier bridge, in which case the GTO valve 71 would be controlled to operate normally as a switching regulator element so as to regulate the average magnitude of alternator field current as desired. The concluding claims are therefore intended to cover all such modifications that fall within the true spirit and scope of the invention.

We claim:

1. A flashover protection system for a traction vehicle propulsion system including at least one d-c traction motor having armature and field windings and a commutator subject to flashovers, a synchronous generator having armature and field windings, a controllable source of excitation current, means for interconnecting the source and the generator field windings, and means including an electric power rectifier for connecting the armature windings of the generator to the commutator, the system comprising:

detecting means for producing a fault signal whenever a flashover occurs in the at least one traction motor;

a solid-state controllable electric valve, operatively connected between the excitation current source and the generator field windings, having alternative first and second states, in the first state, the valve having negligible resistance in the path of generator field excitation current and in the second state, the valve being effective to decouple the source from the generator field windings; and means for changing the valve from first to second states in response to a fault signal produced by the detecting means, such that whenever a flashover occurs, the magnitude of excitation current in the generator field windings is rapidly reduced toward zero and the output current of the generator is correspondingly decreased.

2. The system of claim 1, further comprising:
electrical impedance means operatively connected in parallel circuit relationship with the valve.

3. The system of claim 2, wherein the impedance means comprises:
a capacitor in parallel with a non-linear resistance element.

4. The system of claim 3, wherein the resistance element is a varistor.

5. The system of claim 2, wherein the detecting means further comprises:
current sensing means for deriving a family of feedback signals respectively representative of the magnitudes of armature currents in at least one traction motor; and
means, responsive to the feedback signals, for producing the fault signal, if the magnitude of armature current in the at least one traction motor exceeds a predetermined threshold which is higher than the magnitude of armature current under all normal conditions.

6. The system of claim 2, wherein the valve further comprises:
a gate turnoff thyristor poled to conduct generator field excitation current when in the first state and effectively blocking such current when in the second state.

7. The system of claim 6, wherein the gate turnoff thyristor is shunted by an inversely poled diode.

8. The system of claim 6, wherein the impedance means further comprises:
a capacitor in parallel with a non-linear resistance element.

9. The system of claim 1, wherein the generator field windings are shunted by a relatively low ohmic value resistor in series with a voltage breakover means.

10. The system of claim 1, wherein the detecting means further comprises:
current sensing means for deriving a family of feedback signals respectively representative of the magnitudes of armature currents in at least one traction motor; and
means responsive to the feedback signals for producing the fault signal, if the magnitude of armature current in the at least one traction motor exceeds a predetermined threshold which is higher than the magnitude of armature current under all normal conditions.

11. The system of claim 10, wherein the detecting means further comprises:
means, associated with the generator, for deriving an additional feedback signal representative of the magnitude of ground leakage current in the generator armature windings, the fault signal being produced if the additional feedback signal indicates that the magnitude of ground leakage current exceeds a threshold limit which is higher than a predetermined maximum permissible limit for leakage.

12. The system of claim 1, wherein the detecting means further comprises:
current sensing means, associated with the generator, for deriving a ground leakage current feedback signal representative of the magnitude of ground leakage current in the generator armature windings; and
means, responsive to the ground leaking current feedback signal, for producing the fault signal, if the magnitude of ground leakage current attains at least a predetermined threshold magnitude.

13. The system of claim 12 wherein the synchronous generator includes a set of three-phase star-connected armature windings and the current sensing means is operatively connected between ground and neutral of the generator armature windings.

14. The system of claim 12 further comprising:
control means, associated with the source of generator field excitation current, for varying the magnitude of such current as a function of a variable control signal; and
control means, normally operative in response to selected input signals, for determining the value of the variable control signal, the last-mentioned control means including means for modifying the value of the variable control signal in a manner that reduces the magnitude of excitation current if the feedback signal indicates that the leakage current magnitude is higher than a predetermined deration threshold level but has not exceeded a predetermined maximum permissible limit, wherein the threshold magnitude of leakage current at which the detection means produces the fault signal is higher than the maximum limit.

15. The system of claim 1 including means associated with the source of generator field excitation current for varying the magnitude of such current as a function of the value of a variable control signal and excitation control means normally operative in response to selected input signals for determining the value of the control signal, wherein the excitation control means is arranged temporarily to impose a control signal value corresponding to zero excitation current in response to a fault signal being produced by the detecting means.

16. The system of claim 15 further comprising;
a plurality of electrical contactors connected between the commutator and the power rectifier; and
operating means for causing each of the contactors to change between closed and opened positions, as desired, the operating means being effective to open all contactors in response to a fault signal produced by the detecting means.

17. The system of claim 16 further comprising:
means for deriving a family of current feedback signals, respectively representative of the magnitudes of armature current in at least one traction motor, wherein a current feedback signal responsive means identifies the at least one traction motor having abnormally high armature current, whenever a fault signal is produced by the detecting means; and
additional means, operative after the contactors have been opened in response to the fault signal for causing the operating means to close all contactors, except the ones associated with any identified traction motor.

18. The system of claim 17, further comprising:
means for preventing the operating means from closing the contactors associated with the identified motor for a certain interval after the fault signal is initially produced by the detecting means, the interval being sufficient for the commutator of any identified motor to rotate a certain number of revolutions, if the traction vehicle is being propelled at a relatively high speed.

19. The system of claim 1 further comprising:
an electrical switch connected in series with the valve, and having control means for causing the switch to change between a first state in which it freely conducts generator field excitation current and a second state in which the current is effectively interrupted, whereby the switch control means is effective to change the switch from the first state to the second state, in response to a fault signal produced by the detecting means.

20. The system of claim 19 further comprising:
means, operative after the switch has been changed to the second state in response to the fault signal, for causing the switch control means to return the switch to the first state, the state changing means being effective to change the valve from second to first states in automatic response to the switch control means returning the switch to its first state, if the detecting means is not producing a fault signal.

21. The system of claim 1 further comprising:
means for sensing the magnitude of excitation current in the current path; and
means for preventing the state changing means from changing the valve to the second state whenever excitation current magnitude exceeds a predetermined level.

22. The system of claim 21 further comprising:
a plurality of protective fuses operatively connected between the power rectifier and the generator.

23. A flashover protection system for a traction vehicle propulsion system including at least one d-c traction motor having armature and field windings and a commutator subject to flashovers, a synchronous generator having armature and field windings, a controllable source of excitation current, means for interconnecting the source and the generator field windings, and means including an electrical power rectifier for connecting the armature windings of the generator to the commutator, the system comprising:
detecting means for producing a fault signal whenever a flashover occurs in the at least one motor;
a solid-state controllable electric valve, operatively connected between the excitation current source and the generator field windings, having alternative first and second states, in the first state, the valve has negligible resistance in the path of generator field excitation current and in the second state, the valve is effective to decouple the source from the generator field windings;
state changing means, operatively connected between the detecting means and the valve, for changing the valve from first to second states in response to a fault signal;
means for reducing the magnitude of excitation current in the generator field winding toward zero and toward decreasing the output current of the generator whenever a flashover occurs;
means for preventing the state changing means for returning the valve to the first state for a predetermined delay period after the state changing means changes the valve from the first to the second state; and
electrical impedance means, operatively connected in parallel circuit relationship with the valve, the impedance means comprising a snubber capacitor in parallel with a resistor, the delay period being sufficient to allow the capacitor to discharge through the resistor after the valve has changed from the first to the second state.

* * * * *